United States Patent Office 3,522,294
Patented July 28, 1970

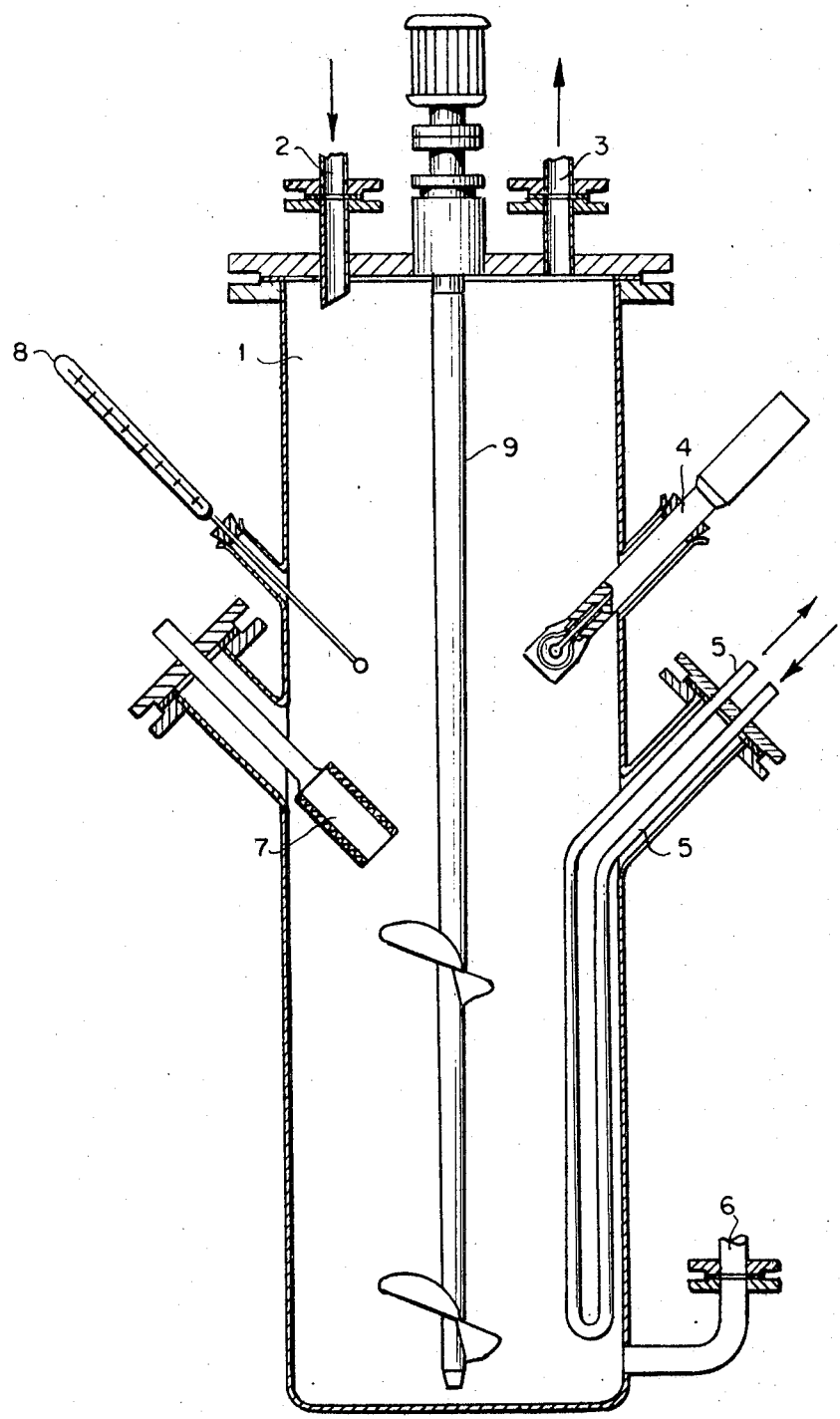

3,522,294
PROCESS FOR PREPARING ALKYL ACRYLATES AND METHACRYLATES
Gianfranco Pregaglia, Milan, and Marco Agamennone and Luigi Cavalli, Novara, Italy, assignors to Montecatini Edison S.p.A., Milan, Italy, a corporation of Italy
Filed Apr. 21, 1966, Ser. No. 544,131
Claims priority, application Italy, Apr. 27, 1965, 9,496/65
Int. Cl. C07c 69/54
U.S. Cl. 260—486    4 Claims

ABSTRACT OF THE DISCLOSURE

Described is a process for preparing compounds selected from the group consisting of alkyl acrylates and methacrylates by oxidation of unsaturated aldehyde selected from the corresponding acrolein and methacrolein, by a free oxygen-containing gas in an alkaline medium and in the presence of a silver catalyst. The improvement comprises:

(a) oxidizing the unsaturated aldehyde in the presence of a tetralkylammonium base,
(b) thermally decomposing the tetralkylammonium salt thus obtained at temperatures comprised between 160° and 250° C., to give the corresponding alkyl ester.

Our invention relates to a process for preparing alkyl acrylates and methacrylates by the transformation of acrolein and methacrolein into said esters, particularly methyl and ethyl acrylates and methacrylates.

It is known that acrolein and methacrolein can be easily obtained by the oxidation of propylene and isobutene by air and oxygen with molar yields above 70%. The obtainment of acrylic and methacrylic esters by using these unsaturated aldehydes as starting materials is therefore of great interest.

In processes known to date, acrylic and methacrylic acids obtained by oxidation of the corresponding aldehydes are esterified with the desired alcohol. This oxidation can be carried out either in an acid or basic medium. In an acid medium oxidation, oxygen or air and transition element catalysts (nickel, copper, cobalt, etc.) are used. This mode of operation leads to poor yields because of substantial degradation of the products with the formation of low molecular weight saturated acids. Moreover, a remarkable formation of peroxidized substances is observed which, by decomposition during the successive operations, catalyze the polymerization of the unsaturated products (C. W. Smith—"Acrolein," John Wiley and Sons, London (1962) page 52).

In alkaline medium oxidation with oxygen or air a finely divided silver catalyst is used while keeping the pH of the reacting medium between 11.5 and 13 by continuous addition of caustic soda or potash. Acrylic acid (or methacrylic acid) is displaced from its salt by means of a mineral acid and is then isolated by known methods. This oxidation occurs with a complete conversion and with yields higher than 90%. It, however, has the disadvantage of requiring a stoichiometric quantity of alkali to first salify and then a stoichiometric quantity of mineral acid to release the unsaturated acid formed in the first stage.

We have found and this is an object of our invention, a simple and economical way of obtaining alkyl acrylates or methacrylates by oxidation of acrolein (or methacrolein) with oxygen or air in an alkaline medium and in the presence of silver as the catalyst by operating according to the following operation stages:

(a) oxidation of acrolein (or of methacrolein) in the presence of a tetralkylammonium base,
(b) thermal decomposition of the acrylic (or methacrylic) acid salt thus obtained is at temperatures between 160 and 250° C. thus obtaining the alkyl acrylate or methacrylate.

Operating stage (b) produces together with the alkyl acrylate (or methacrylate), stoichiometric amounts of trialkylamine. This amine can then be reacted so as to regenerate, in a way known per se, the quaternary ammonium base used in operating stage (a).

For the sake of better clearness, the operative cycle can be summarized as follows:

$$CH_2=CH-CHO + \tfrac{1}{2} O_2 + R_4N-OH$$
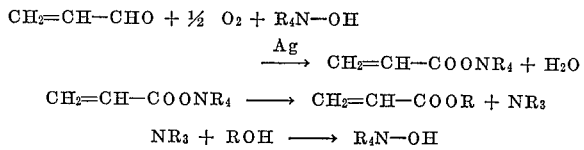
$$CH_2=CH-COONR_4 + H_2O$$

$$CH_2=CH-COONR_4 \longrightarrow CH_2=CH-COOR + NR_3$$

$$NR_3 + ROH \longrightarrow R_4N-OH$$

wherein R is $CH_3-$ or $C_2H_5-$. The cycle occurs analogously in case of methacrolein.

If the hydroxide of tetramethyl-or tetraethylammonium is used as the tetralkylammonium base in this process, methyl or ethyl acrylate (or methacrylate) is obtained with high yields.

The first stage of the process (operating stage a) consists of the oxidation of the unsaturated aldehyde to the tetralkylammonium salt of the corresponding acid. The reaction is carried out at a moderate temperature (generally between 0 and 40° C.) by introducing oxygen (or air), the unsaturated aldehyde and the quaternary base into an aqueous suspension of finely divided silver. Oxygen can be introduced per se or diluted with inert gases such as nitrogen or argon. In the presence of pure oxygen, atmospheric pressure is suitable; in case of gases with a low oxygen content, a total pressure above atmospheric pressure is preferable. The amount of oxygen fed is in excess of the stoichiometric requirements.

The unsaturated aldehyde can be introduced as a liquid, e.g., in the form of an aqueous solution, or as a gas, possibly diluted with another gas (e.g. oxygen or air). Almost all of the aldehyde fed is oxidized to acid, under reaction conditions. An excess is harmful, since it is polymerized. The amount of aldehyde per hour depends on the catalyst amount and on the temperature.

The quaternary ammonium base is fed preferably as an aqueous solution. The pH of the reaction medium must be kept between 11.5 and 13, and preferably between 12 and 12.5.

The catalyst is easily prepared by precipitating silver oxide by a caustic alkali from a silver salt (e.g. silver nitrate) solution and then reducing the oxide to metal by an aldehyde. This reduction can be carried out directly in the same reactor by means of the unsaturated aldehyde. The catalytic suspension may have a silver content varying within wide limits, preferably between 4 and 15% by weight.

The aqueous solution of tetralkylammonium salts formed is removed from the reactor by filtration through a filter suitably located therein. With this system, the catalyst remains in the reaction zone. The reactor has an effective agitator which intimately contacts solution, gases and catalyst, and suitable means for removing the reaction heat. The solution discharged from the reactor, containing the quaternary salt of the unsaturated acid, is suitably concentrated according to conventional techniques.

The second stage of the process (operating stage (b)) consists in thermal decomposition of the quaternary salt of the unsaturated quaternary salt of the unsaturated acid. This can be carried out by using apparatuses known in the art. A common still produces satisfactory results. An aim of this thermal treatment is to remove the small residual amounts of water from the preceding concentration and to heat the ammonium salt to a temperature between 160 and 250° C., and preferably between 180 and 200° C. This treatment causes the decomposition of tthe tetralkyl-ammonium salt into alkyl ester of the unsaturated acid and into the tertiary amine. The latter can then be separated by rectification of the raw reaction product. The esters thus obtained are characterized by a high purity. The small amounts of alcohol which may be present, depend on a slight excess of quaternary ammonium salt with respect of the unsaturated acid formed in the reaction. This shows that the base is decomposed according to the reaction:

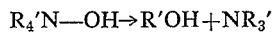

$$R_4'N-OH \to R'OH + NR_3'$$

The decomposition can be carried out under atmospheric pressure or also under reduced pressure. In order to accelerate the reaction, a catalyst can be conveniently added. In any case, the yields are almost quantitative, with the formation of equimolecular amounts of ester and of tertiary amine, in amounts equivalent to the quaternary ammonium salt introduced.

The drawing schematically shows the apparatus in which the oxidation tests reported in the examples were carried out.

Reactor 1 has an inner diameter of 8 cm. and an inner length of 29 cm. Oxygen-rich gas is bubbled through a carburetor containing the unsaturated aldehyde and then introduced into the reactor through pipe 6. The quaternary ammonium base is fed into the reactor through pipe 2. The pH is measured by glass electrode 4. The unreacted gases are discharged through pipe 3. The homogenization of the mass is obtained through agitator 9. Filter 7 serves to remove the tetralkylammonium salt solution from the silver catalyst. Pipe 5 in which water is circulated, maintains a low reaction temperature.

The following examples are to illustrate the invention without limiting the same.

EXAMPLE 1

An aqueous suspension (900 cc.) of 30 g./l. of Ag₂O, obtained as described above, was charged in the reactor described above.

13 Nl./h. of gas consisting of 78% of oxygen and 22% of methacrolein are then fed into the reactor. During the run, the temperature of the reactor was kept at 25° C. and the pH a t 11.9–12 by continuous introduction of an aqueous solution containing 7% of tetramethylammonium hydroxide. In the solution removed from the reactor and in that found in the reactor at the end of the run, were 48 g. of tetramethylammonium methacrylate, corresponding to a molar yield of about 95% on the treated methacrolein. The aqueous solution, thus obtained and containing 48 g. of tetramethylammonium methacrylate, was concentrated under reduced pressure to a salt content of 60%.

Distillation under ordinary pressure was then carried out by heating the distillation vessel to 200° C. A 0.5 g. residue and an aqueous distillate containing 29.7 g. of methylmethacrylate and 26.8 g. of trimethylamine, corresponding to a decomposition yield of 98.5 and 97.5%, respectively, of methylmethacrylate and of trimethylamine were obtained.

EXAMPLE 2

An aqueous suspension (900 cc.) with 42 g./l. of Ag₂O, prepared as described above, was charged in the reactor of Example 1.

10 Nl./h. of a gaseous stream consisting of 66.8% of oxygen and 33.2% of acrolein were then introduced. The temperature of the reactor was kept at 1° C. The pH of the reaction medium was kept between 12 and 12.2 by gradual addition of tetramethylammonium hydroxide. In the aqueous solution removed from the reactor and in that contained in the reactor at the end of the run, 57.2 g. of tetramethylammonium acrylate were found. This corresponds to a yield of about 90% on the acrolein introduced into tthe reactor.

A portion of the aqueous solution thus prepared and containing 50 g. of tetramethylammonium acrylate was concentrated under reduced pressure until all the water present was removed. The salt obtained was then heated under ordinary pressure to a temperature of about 190° C. In the decomposition of tthe salt, 27 g. of methyl acrylate and 20 g. of trimethylamine, corresponding to 91% and 98%, respectively, of the calculated amount, were obtained by distillation.

EXAMPLE 3

An aqueous suspension (900 cc.) containing 45 g./l. of Ag₂O obtained by warm precipitation of a diluted solution of silver nitrate with caustic soda, was charged in the reactor of Example 1. 29.3 g. of methacrolein diluted with an oxygen stream and 28.7 g. of tetramethylammonium hydroxide in the form of a 10% (by weight) aqueous solution, were fed over a 3 hour period, with the reactor at 20° C. The rate of addition of the base was such as to keep the pH at 12.2. The level of the liquid in the reactor was kept constant, by removing the solution through the filter.

62.2 g. of tetramethylammonium methacrylate, corresponding to the calculated yield in respect of the quaternary ammonium base and to a yield of 93.5% on the methacrolein fed, were obtained. The product obtained was treated as described in Example 1, thus giving methylmethacrylate and trimethylamine.

EXAMPLE 4

The experiment described in Example 1 was repeated with the exception that tetraethylammonium hydroxide in a 10% aqueous solution was used instead of tetramethylammonium hydroxide.

56.6 g. of tetraethylammonium methacrylate, corresponding to a yield of 75% on the methacrolein fed to the reactor (25.7 g.) were obtained. The product obtained, treated as described in Example 1, gave ethylmethacrylate and triethylamine.

The term Nl./h. means liters per hour under normal or standard conditions. The term free oxygen-containing gas as used in the claims means oxygen per se or air. Unsaturated aldehyde as used in the claims encompasses acrolein or methacrolein.

Obviously many modifications and variations of the present invention are possible in the light of the above teachings. It is therefore to be understood that within the scope of the appended claims, the invention may be practiced otherwise than as specifically described.

We claim:

1. The process of preparing alkyl acrylates by oxidation of acrolein in the presence of a tetralkylammonium base selected from the group consisting of tetramethyl- and tetraethylammonium hydroxide at a pH between 11.5 and 13 at a temperature between 0° and 40° C. to give the acrylic acid salt, decomposing said acrylic acid salt at a temperature between 160° and 250° C. to give the corresponding alkyl acrylate.

2. The process of preparing alkyl methacrylates by oxidation of methacrolein in the presence of a tetralkylammonium base selected from the group consisting of tetramethyl- and tetraethylammonium hydroxide at a pH between 11.5 and 13 at a temperature between 0° and 40° C. to give the methacrylic acid salt, decomposing said methacrylic acid salt at a temperature between 160° and 250° C. to give the corresponding alkyl methacrylate.

3. The process of claim 1 wherein the pH is between 12 and 12.5.

4. The process of claim 3, wherein the decomposition of the tetralkylammonium ester is at a temperature between 180° and 200° C.

References Cited

UNITED STATES PATENTS

| 2,677,699 | 5/1954 | Barney | 260—486 |
| 2,930,801 | 3/1960 | Montagna et al. | 260—530 XR |
| 3,162,682 | 12/1964 | Shotts et al. | 260—530 XR |

OTHER REFERENCES

Fuson et al., J. Am. Chem. Soc., vol. 61, p. 1290 (1939).

LORRAINE A. WEINBERGER, Primary Examiner

P. J. KILLOS, Assistant Examiner

U.S. Cl. X.R.

260—530